United States Patent [19]

Milburn et al.

[11] Patent Number: 5,179,610
[45] Date of Patent: Jan. 12, 1993

[54] CONNECTOR FOR COUPLING OF LASER ENERGY

[75] Inventors: James A. Milburn, Santa Ana; Vahid Saadatmanesh, Irvine; Raymond Dessoffy, Laguna Niguel; L. Dean Crawford, Irvine; Hany M. G. Hussein, Costa Mesa, all of Calif.

[73] Assignee: Trimedyne, Inc., Irvine, Calif.

[21] Appl. No.: 687,838

[22] Filed: Apr. 19, 1991

[51] Int. Cl.$^5$ .................................................. G02B 6/36
[52] U.S. Cl. ........................................ 385/92; 385/31; 385/76; 385/147
[58] Field of Search .............. 385/31, 33, 38, 76–79, 385/84, 88, 92, 93, 127, 128, 147

[56] References Cited

U.S. PATENT DOCUMENTS

| | | | |
|---|---|---|---|
| 4,521,070 | 6/1985 | Sottini et al. | 385/31 |
| 4,537,193 | 8/1985 | Tanner | 385/84 X |
| 4,676,586 | 6/1987 | Jones et al. | 385/127 X |
| 4,762,385 | 8/1988 | Fuse | 385/127 X |

Primary Examiner—John D. Lee
Attorney, Agent, or Firm—Dressler, Goldsmith, Shore, Sutker & Milnamow, Ltd.

[57] ABSTRACT

A coupling system for coupling a beam of radiant energy from a laser to a fiber optic cable includes a secondary transmission path which surrounds the input end of the fiber optic cable and provides an optical path for energy which is not transmitted by the fiber optic core but is lost. Displaced from an output end of the secondary transmission path is a multi-faceted reflector. The reflector is displaced sufficiently from the output end of the secondary transmission path so that the power density of the radiation incident thereon is reduced sufficiently so as to not damage the facets thereof. The coupling system is contained within a heat sink which receives the reflected and lost radiant energy harmlessly converting same to heat.

23 Claims, 4 Drawing Sheets

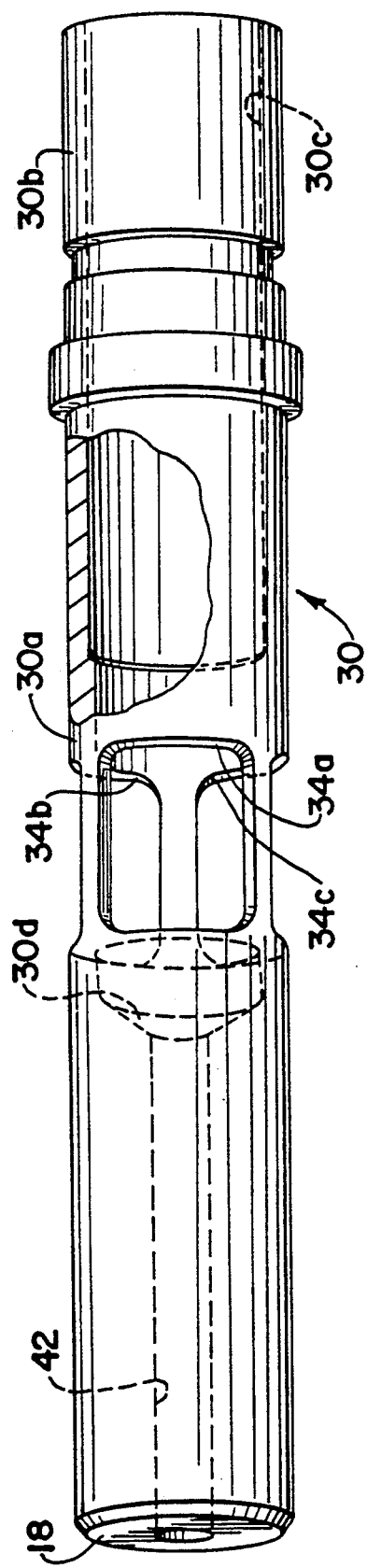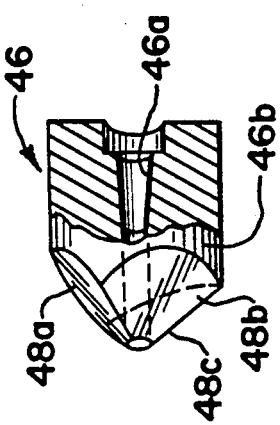

CONNECTOR FOR COUPLING OF LASER ENERGY

FIELD OF THE INVENTION

The invention pertains to connectors usable to couple radiant energy to a conducting medium. More particularly, the invention pertains to a coupling system for coupling focused radiant energy from a laser to a fiber optic conductor.

BACKGROUND OF THE INVENTION

Medical devices which are energized by laser generated radiant energy such as scalpels or angioplasty systems are known. Such devices use a laser source to generate focused monochromatic radiant energy. This radiant energy is then injected into a fiber optic cable for transmission to the treatment effecting instrument.

As higher power lasers have become available, it has become apparent that more efficient coupling systems are needed between the focused radiant energy laser beam and the fiber optic cable.

With high power lasers, the focused radiant energy beam can have an energy density which is great enough to damage, by softening, melting, or fusing, any materials which are not highly optically transmissive. In addition, it is well recognized that to inject and transmit radiant energy into an end of and along a fiber optic member, the energy must be injected within a predeterminable acceptance angle with respect to the axis of the cable. This angle defines an acceptance cone.

Light incident on the end of the cable at an angle which exceeds the acceptance angle will, in all likelihood, not be transmitted along the fiber but will be radiated from the periphery of the cable. Thus, light incident at an unacceptable angle is one source of lost radiant energy which can produce heat in a coupling system.

A second source of radiant energy which produces heat in a coupling system is spillover radiant energy which is not injected into the end of the fiber optic cable. This spillover energy component is due to the output of the laser beam not being perfectly focused to produce a spot size equal to or smaller than the diameter of the input end of the fiber optic cable. Additional sources of radiant energy which produce heat in a coupling system is that portion which enters the cladding of the fibers as well as energy transmitted in the space between fibers.

Hence, there is a need for coupling systems which are usable for coupling radiant energy to fiber optic cable while simultaneously providing for deflection and dissipation of radiant energy which exits the fiber optic cable in the vicinity of the connector system, and for deflection and dissipation of spillover radiant energy not injected into the fiber optic cable. Preferably, such a coupling system would not generate inordinate amounts of heat so as to be uncomfortable or dangerous to a user. In addition, such a coupling system would preferably be relatively small.

SUMMARY OF THE INVENTION

A connector for coupling radiant energy from a source to a primary optical transmission system includes a housing which supports a proximal end of the transmission system. The proximal end is surrounded by an elongated secondary radiant energy transmission path. The secondary transmission path terminates near a multi-sided reflector. The reflector, the secondary transmission path and the proximal end all are aligned on a common axis.

Radiant energy coupled to the proximal end is transmitted by the primary optical system. Radiant energy that is not coupled to the proximal end or is lost therefrom is conducted along the secondary transmission path to the reflector.

Reflected radiant energy can be directed away from the primary optical transmission system to a heat sink. Radiant energy incident on the heat sink is harmlessly converted to heat.

The reflector member includes a cylindrical body portion with an axial boring therethrough for the primary transmission system. One end of the body portion, adjacent to the secondary transmission path, carries a multi-faceted or conical reflector surface.

The reflector can be formed of metal such as copper, or can be a high temperature, material, such as ceramic with a deposited reflective surface or layer. The reflector surfaces are displaced from the output end of the secondary transmission path far enough to reduce the energy density of the radiant energy incident thereon to non-destructive levels.

The primary and secondary transmission paths along with the reflector can be supported in axial, spaced apart relationships by a cylindrical housing. The housing can be provided with openings or transmissive windows to enable radiant energy reflected from the reflector to impinge on an adjacent heat sink.

A method of transferring radiant energy from a focused source includes directing a focused region of the source to a predetermined plane; conducting a portion of the focused radiant energy incident on the plane along a first path; conducting a different portion of the focused radiant energy incident on the plane along a second path; directing the portion to a predetermined location and directing the different portion to a predetermined sink.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWING

FIG. 3 is an enlarged, side, elevational view, partly broken away, of a housing for the coupling system of FIG. 2;

FIG. 4 is an enlarged, side elevational view, partly broken away, of a reflector usable with the coupling system of FIG. 2.

DETAILED DESCRIPTION OF THE PREFERRED EMBODIMENTS

Figure 1:
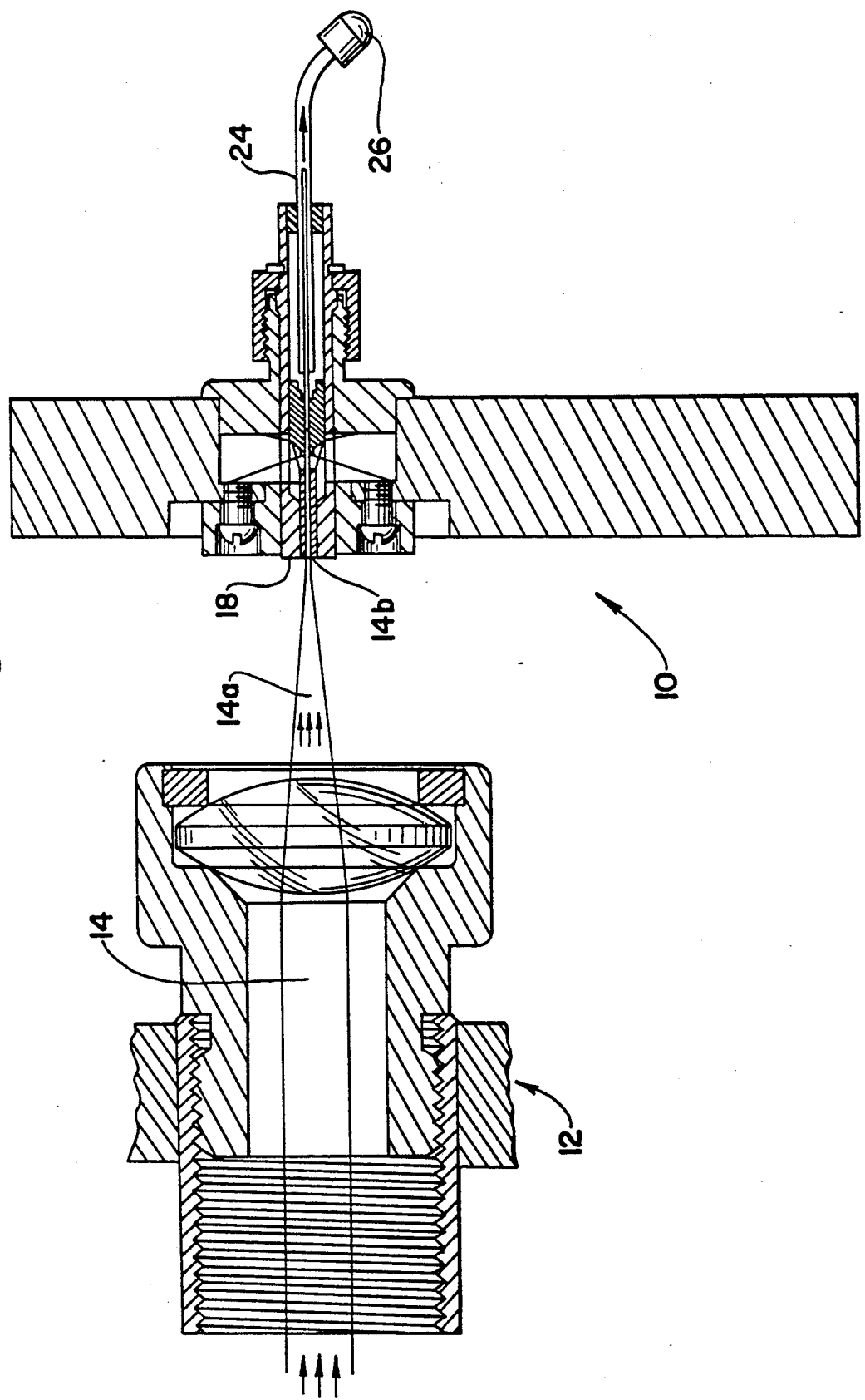
FIG. 1 is an overall view, partly in section, of a radiant energy transmission system in accordance with the present invention.

While this invention is susceptible of embodiments in many different forms, there is shown in the drawing and will be described herein in detail specific embodiment thereof with the understanding that the present disclosure is to be considered as an exemplification of the principles of the invention and is not intended to limit the invention to the specific embodiments illustrated.

FIG. 1 illustrates a coupling system 10 usable with a laser 12. The laser 12 could be either a pulse or a continuous wave laser. The laser 12 generates a monochromatic radiant energy output beam 14.

For example, one particular type of laser usable with the coupling system 10 is a high energy pulsed laser system known as a holmium:YAG laser. Such lasers are capable of generating monochromatic beams of radiant energy 14 which can be formed of Q switched pulses on the order of 300 nanoseconds in pulse width or free running pulse trains with an envelope on the order of 1-3,000 microseconds in width.

Energy levels associated with Q switched 300 nanosecond pulses can be on the order of 500 mj/pulse. For free running pulse trains, energy levels can be up to 75 J/pulse.

The laser 12 includes a lens system 16 which forms a focused output beam 14a. The beam 14a is focused to a spot 14b in the vicinity of input focal plane 18 of the coupling system 10. Output, focused, spot size for the above noted types of lasers is on the order of 500 microns.

The coupling system 10 functions to couple substantial portions of the focused radiant energy beam 14a to a primary fiber optic transmission member 24. The member 24 can be a radiant energy transmission conduit for an instrument 26 which uses radiant energy for heating, cutting or ablating purposes.

One such instrument for example could be a laser angioplasty probe. Such systems are used for ablating obstructions in lumens, such as blood vessels, of individuals.

The fiber optic member 24 can be formed of a single, cladded, fiber optic member having a 200 micron or larger diameter. Alternately, the fiber optic bundle 24 can be formed of a plurality of small diameter fiber optic members, on the order of 50-300 microns, which have been collected together to form a fiber optic transmission cable.

It will be understood that the type of instrument or system 26 utilizing the radiant energy delivered by the fiber optic cable or member 24 is not a limitation of the present invention. Nor is the specific form of the primary transmission medium 24.

Figure 2:
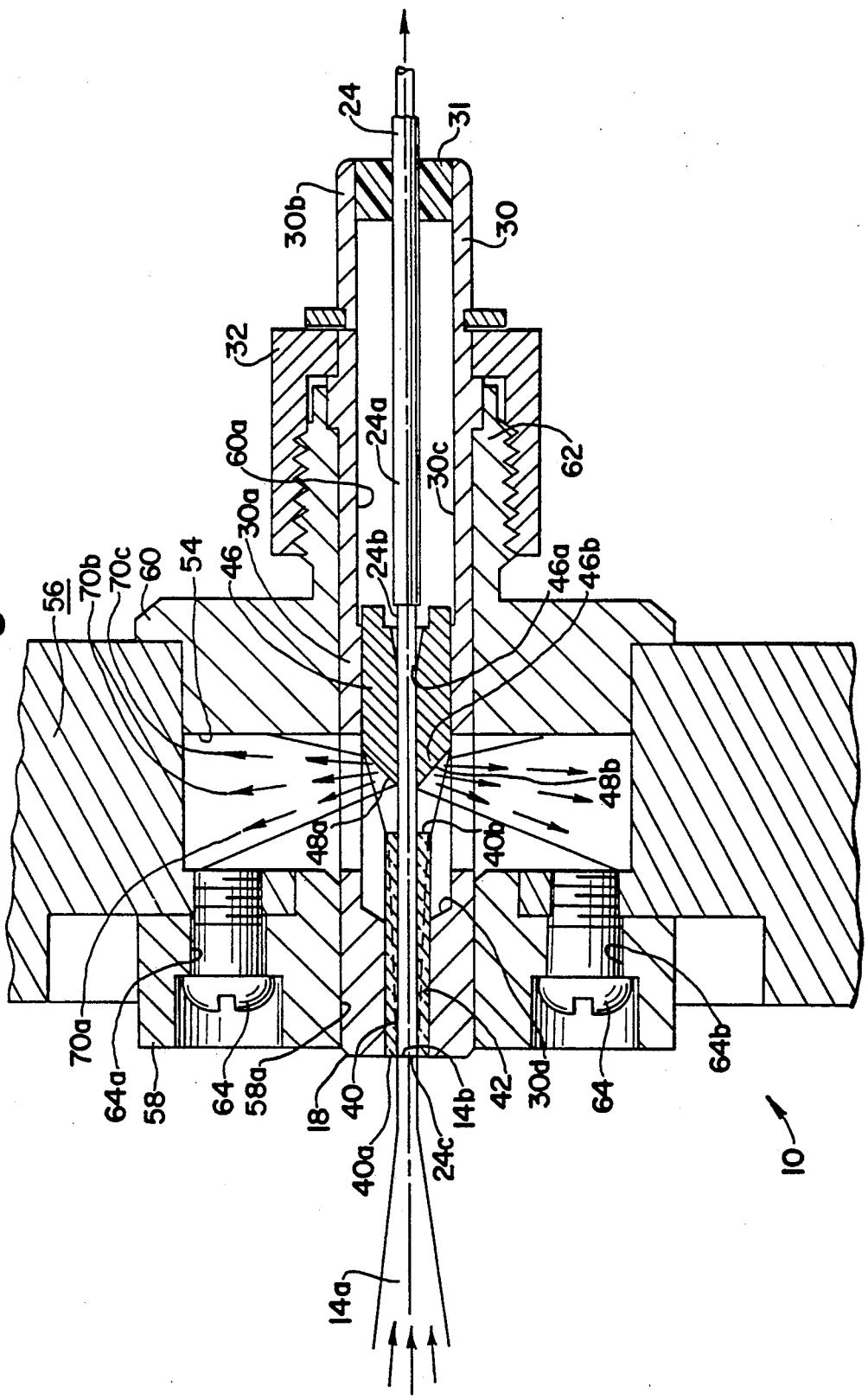
FIG. 2 is an enlarged, side elevation view, partly in section of a radiant energy coupling system in accordance with the present invention.

FIG. 2 illustrates details of the connector system 10. The fiber optic transmission member 24 is carried in part within an elongated hollow body member 30 which at a proximal end 30a, is coupled to the connector system 10. A distal end 30b of the housing 30 and a strain relief 31 support the transmission member 24 which in turn is coupled to the selected heating, cutting or ablating radiant energy delivery instrument 26. A channel 30c extends through a substantial portion of the proximal end 30a.

The proximal end 30a is mechanically coupled to the system 10 by a conventional coupling element 32 such as a locking nut. It will be understood that the exact structure of the coupling element 32 is not a limitation of the present invention.

The proximal end 30a of the housing 30 is pierced with a plurality apertures 34a, 34b and 34c (Best seen in FIG. 3). The apertures 34a-34c are generally rectangular and are spaced around the periphery of the body member 30. These apertures provide transmissive openings for spillover radiant energy from the focused beam 14a.

The proximal end 30a terminates in the previously noted focal plane 18 spaced from but adjacent to the output from the laser 12. If the focused spot 14b of the beam 14a is optimally sized and located, it will impinge on only a proximal input end 24c of the medium 24.

Absent optimal sizing and location, a portion of the incident radiant energy beam may miss the end 24c. This misdirected or "spillover" radiant energy will impinge on the system 10 at the focal plane 18 adjacent to the input end 24c of the primary radiant energy conductor 24. As discussed subsequently, the system 10 includes structures for conducting, diffusing, and deflecting this spillover radiant energy.

The coupling system 10 also includes a quartz collar or secondary transmission medium 40 carried within a channel 42 defined in the proximal end 30a adjacent the focal plane 18. The medium 40 includes a radiant energy input end 40a located on the focal plane 18 and an output end 40b located in the channel 30c. The medium 40 can be cladded in order to prevent leakage of the light being transmitted through this medium.

The secondary channel 40 could be formed by other highly transmissive optical materials such as glass or Zirconium Fluoride. The channel 40 provides an optical path for the spillover radiation from the focused beam 14a which is not injected into the input end 24c of the primary optic member 24. Channel 40 also provides means for expanding the diameter of the beam being transmitted through this channel thus reducing the power density at the reflector surface.

The use of the secondary optical path 40 makes it possible to provide a radiant energy input having an energy or power density high enough to damage or destroy non-optically transmissive materials. As a result, the diameter of the spot size of the focused beam 14a on the focal plane 18 can safely exceed the diameter of the fiber optic input end 24c without damaging the coupling system 10.

In the region of the housing 30 displaced from the proximal end 30a the conducting element 24 is covered by a conventional cladding 24a. In the vicinity of the proximal end 30a, the cladding 24a has been removed to expose the fiber optic core 24b. The exposed fiber optic core 24b extends through the secondary quartz transmission collar 40 and terminates at the radiant energy input end 24a.

In the embodiment of FIG. 2, the fiber optic element 24 is formed of a single elongated fiber. Alternately, an optical cable formed of a plurality of coextensive fiber optic members could be used.

The coupling system 10 also includes a multifaceted reflector member 46. The member 46 is carried within the proximal end 30a of the housing 30 in the channel 30c and defines an axial channel 46a through which the fiber optic core 24b extends.

The reflector 46 is formed with a plurality of reflecting surfaces 48a, 48b and 48c spaced about an end 46b of the reflector. The end 46b is adjacent to the output end 42b to the quartz collar 42. Each of the reflector facets 48a–48c is formed as a plane on the end 46b of the reflector 46.

The reflector 46 is received with a friction or interference fit within the channel 30c immediately adjacent to the ports 34a, 34b and 34c.

The section of the member 24 which extends through the secondary optical transmission path 40 will not be damaged by the high power density of the incident focused beam 14a. Nor will the highly transmissive quartz member 40.

Since the cladding 24a has been removed in the region adjacent to the quartz member 40 and the reflector 46, radiant energy not traveling axially along the optical conductor 24b can escape into the secondary transmission member 40 or the reflector 46 while within the coupling system 10. Thus, this portion of the system 10 provides a highly optically conductive path which will not be damaged by the focused beam 14a. The displaced reflector 46 receives only a portion of the energy from the beam 14a and at a lower, non-destructive energy density.

Adjacent to the ports 34a, 34b and 34c is a dissipation chamber 54. The chamber 54 is defined by one or more metal members including an annular central member 56 which is sandwiched between a laser-side plate 58 and a radiator side plate 60.

The laser-side plate 58 includes a boring or channel 58a through which a portion of the housing extends. The radiator-side plate 60 includes a channel 60a through which a portion of the proximal end 30a of the housing 30 extends. The housing 30 can be physically coupled to the radiator side plate 60 at a cylindrical flanged end 62 by means of the releasable coupling member 32.

The three members 56, 58 and 60 can be rigidly coupled together via bolts 64 which extend through borings 64a and 64b in the plate 58. When assembled the three plates 56, 58 and 60 form a heat sink which receives radiant energy from the focused beam 14a which is not coupled to the fiber optic member 24. This "spill over" energy is transmitted via quartz conduit 40 to facets 48a, 48b and 48c and then reflected into the dissipation chamber 54.

This deflected radiant energy is indicated schematically in FIG. 2 by reflected rays 70a, 70b and 70c. Hence, by using quartz secondary optic conduit 40 in combination with the reflector 46, the power density of the incident focused beam 14a is reduced to a level which is non-destructive of the facets 48a, 48b and 48c. It is thus possible to harmlessly deflect that unwanted radiant energy into the heat sink formed of the elements 56, 58 and 60 to provide for its harmless dissipation without injury to the coupling system 10.

While the prior discussion related to a fiber optic member 26 having a single fiber optic conducting element, it will be understood that the system 10 is usable with fiber optic cables having a plurality of individual, bundled fiber optic members, thereby forming a cable with a larger optically transmissive cross-section.

If desired, the metal annular element 56 could be square or rectangular in cross-section and could alternately be fitted with fins to improve the heat dissipation characteristics thereof.

FIG. 3 illustrates the three windows 34a, 34b and 34c spaced around the body of the tubular member 30. Alternately the member 30 could be formed without the indicated discrete windows as two spaced apart sections.

FIG. 4 illustrates the planar facets 48a, 48b and 48c of the reflector 46. Alternately, the reflector 46 could be formed with a continuous conical surface instead of the indicated discrete planar reflectors.

Figure 5:
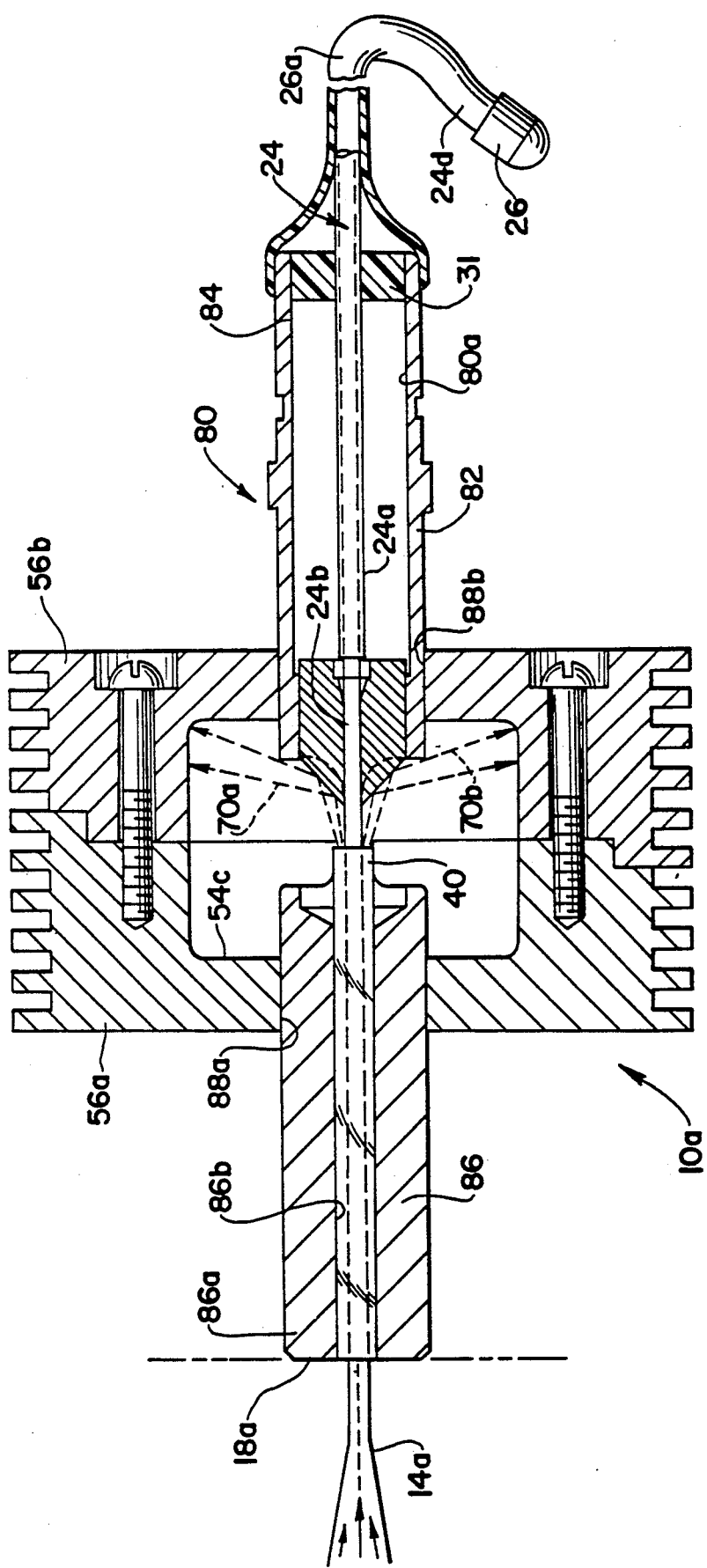
FIG. 5 is an enlarged, side elevational view of an alternate embodiment of a coupling system that embodies the present invention.

FIG. 5 illustrate an alternate coupling system 10a which embodies the principles of the present invention. The system 10a includes a cylindrical hollow metal tubular member 80 with a proximal end 82 and a distal end 84. The hollow member 80 defines an interior channel 80a.

The reflector 46 is pressed into the proximal end 82. The reflector 46 engages the proximal end 82 with an interference fit in the region 82a.

Carried within the elongated cylindrical member 80 is the fiber optic member 26. The fiber optic member 26 terminates at a distal end 24d, at the radiant energy receiving instrument 26 illustrated schematically in FIG. 3. The fiber optic element 24 is covered with a protective sheath 26a after it exits the distal end 84.

The strain relief 31 has been provided at the distal end 84 to minimize stresses and deflection of the portion of the fiber optic member 24 which extends through the channel 80a.

In the embodiment of the coupling system 10a illustrated in FIG. 5 a focusing plane 18a of the focused laser beam 14a is located adjacent to an end region 86a of a cylindrical hollow metal stem 86. The stem 86 defines a channel 86b therethrough wherein the quartz member 40 is located.

The hollow elongated cylindrical housing 80 and stem 86 are supported and spatially displaced with respect to one another by first and second heat sink members 56a and 56b. The members 56a and 56b, when coupled together, define a dissipation chamber 54c which receives radiant energy beams 70a and 70b reflected off of the facets of the reflector 46.

The heat sink member 56a defines a channel 88a which receives the metal stem member 86. The heat sink member 56b defines a channel 88b which receives the proximal end 82 of the metal member 80.

In the embodiment 10a of FIG. 5 the cylindrical members 80 and 86 are separate. A result, no radiant energy transmitting openings are needed as in the system 10.

As was the case with the system 10, the cladding 24a has been removed from the portion of the conduit 24 which extends through the radiator 46 and through the hollow quartz member 42. Thus, only highly optically transmissive members are present in the channel 86b.

The metal members 56, 58, 60 or 56a and 56b can be formed of aluminum, copper or any other high thermal conductivity metal. It is again to be emphasized that the secondary optical conduit, hollow quartz member 40 provides an optical pathway for spillover radiant laser energy which impinges on the focusing plane 18 or 18a of the coupling system 10 or 10a and which is not received within the fiber optic conducting member 26.

When this spillover of radiant energy exits the secondary quartz optical conduit 40 within the dissipation chamber 54 or 54c, it then impinges on the larger surface area of the facets 48a, 48b and 48c with a low enough power density so as not to destroy the same. Hence, the quartz optical conduit 40 not only serves as a pathway for diverting the spillover radiant energy but provides a vehicle whereby the energy density of same can be manipulated and reduced prior to impinging upon the reflector 46.

The reflector 46 can be formed of a polished reflecting metal such as copper, aluminum, copper alloys or a ceramic material upon which has been deposited a reflecting metallic layer of the facets 48a, 48b and 48c.

The orientation of each of the facets 48a, 48b and 48c is on the order of 45 degrees with respect to an axial center line of the connector system 10 or 10a. It will be understood that other angular orientations could be used as well as different numbers of facets without departing from the spirit and scope of the present invention. It will also be understood that a reflector with a coaxial end could be used instead of the reflector 46 with discrete spaced apart facets.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:

1. A connector for coupling laser energy from a laser source to a fiber optic delivery system comprising:
    an elongated, hollow housing;
    a primary laser energy conduit for receiving laser energy from said source and including a fiber optic member that extends through said housing and has one end proximal to the laser source;
    a secondary laser energy conduit including a quartz collar about said proximal end of said primary conduit and terminating in substantially the same plane as said proximal end thereof;
    a multi-faceted reflector situated in the path of laser energy emitted by said quartz collar for reflecting at least a portion of said so emitted laser energy; and
    a metal member surrounding said reflector and an adjacent region of said housing and defining a closed region which receives said reflected laser energy.

2. A connector as in claim 1 with said metal member including a heat sink.

3. A connector as in claim 1 with said secondary conduit having an emitting surface and with said reflector including an elongated body with a primary laser energy conduit receiving pathway extending therethrough, said elongated body terminating in a plurality of spaced apart, shaped, metal reflecting surfaces located within said defined region and oriented so as to be located adjacent to said emitting surface.

4. A connector as in claim 3 with said primary conduit extending, at least in part, through said pathway.

5. A connector as in claim 1 with said secondary conduit having a cladding at its inner surface.

6. A connector as in claim 1 with said secondary conduit having a cladding at its outer surface.

7. A connector for coupling radiant energy from a source to a fiber optic delivery system comprising:
    an elongated, hollow housing open at least at one end;
    a primary radiant energy conduit for receiving radiant energy from the source and including a fiber optic member that extends through said housing and has one end proximal to said one end of the housing and to the source;
    a secondary radiant energy conduit constituted by a quartz collar about said proximal end of the fiber optic member and terminating in substantially the same plane as said proximal end of the fiber optic member;
    an energy sink means; and
    reflector means situated in the path of radiant energy emitted by said quartz collar for reflecting the so emitted energy to said sink means.

8. A connector as in claim 7 with said reflector means including an elongated body member with a plurality of reflecting surfaces carried thereon.

9. A connector as in claim 8 with said reflecting surfaces spaced apart from one another about said body member and positioned adjacent to said quartz collar.

10. A connector as in claim 8 with said reflecting surfaces including at least a metallic reflecting region.

11. A connector as in claim 7 with said energy sink means including a metal housing which at least in part surrounds said secondary conduit.

12. A connector for coupling laser energy from a focused laser source to a fiber optic delivery system which comprises:
    a hollow, elongated body substantially symmetrical about a longitudinal axis with a proximal end and a distal end, said body defining a window transparent to laser energy at an intermediate region thereof, and defining a laser beam focus plane at said proximal end thereof;
    a quartz tube within said elongated body and substantially coaxial therewith, one end of said quartz tube terminating at said focus plane and the other end extending into but not through said intermediate region;
    an optical fiber received within said quartz tube, extending through said hollow elongated body, and terminating at said focus plane;
    an annular laser beam reflector means within said hollow elongated body and about a longitudinal portion of said optical fiber, said reflector means being carried by said body juxtaposed relative to but spaced from said other end of the quartz tube so as to receive a laser beam emitted from said quartz tube and to reflect the received laser beam through said window and away from the longitudinal axis of the hollow elongated body; and
    an energy sink carried by said body for absorbing laser energy reflected by said reflector means.

13. The connector in accordance with claim 12 wherein said reflector means is provided with plural facets contiguous to one another and facing said other end of said quartz tube.

14. The connector in accordance with claim 12 wherein said reflector means is provided with plural substantially planar reflecting surfaces that face said other end of the quartz tube and intersect along substantially straight lines of intersection that extend radially outwardly from said longitudinal axis and are substantially evenly spaced from one another.

15. The connector in accordance with claim 14 wherein said reflector means is provided with three reflecting surfaces and said lines of intersection are about 120 degrees apart.

16. The connector in accordance with claim 12 wherein said energy sink is a hollow housing surrounding said window but spaced from said reflector means.

17. The connector in accordance with claim 16 wherein said hollow housing is provided with heat-dissipating fins.

18. A method of transferring high intensity radiant energy from a source to a fiber optic conductor comprising:

directing a beam of radiant energy from the source toward a proximal end of the fiber optic conductor;

focusing the beam to a region adjacent the proximal end of the fiber optic conductor;

transmitting at least a portion of the focused beam along the fiber optic conductor;

directing at least part of the non-transmitted radiant energy beam along an alternate optical path; and diverting the radiant energy in the alternate path to a predetermined location different from the fiber optic conductor by reflecting the radiant energy away from the fiber optic conductor.

19. A method as in claim 18 including:

heating a member with the reflected radiant energy.

20. A system for providing radiant energy to a selected treatment device comprising:

a source of a beam of radiant energy;

a focusing system for focusing the beam to a spot at a predefined region;

an optical transmission member with a proximal end and a distal end, said distal end couplable to the treatment device;

an optical coupler carrying said proximal end and locating same at said predefined region with said spot incident thereon, said coupler including a reflector and a secondary optical transmission medium, coextensive with said proximal end, and having an input end located adjacent to said spot.

21. A system as in claim 20 with said reflector having a common axis with said secondary medium.

22. A system as in claim 20 with said reflector including a plurality of spaced apart facets.

23. A system as in claim 20 including a heat sink.

* * * * *